(12) United States Patent
Park et al.

(10) Patent No.: US 9,293,793 B2
(45) Date of Patent: Mar. 22, 2016

(54) BATTERY PACK

(75) Inventors: Jin-Sung Park, Yongin-si (KR); Chul-Jung Yun, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 662 days.

(21) Appl. No.: 13/302,502

(22) Filed: Nov. 22, 2011

(65) Prior Publication Data

US 2012/0251849 A1 Oct. 4, 2012

(30) Foreign Application Priority Data

Mar. 31, 2011 (KR) .......................... 10-2011-0029663

(51) Int. Cl.
| | |
|---|---|
| *H01M 2/00* | (2006.01) |
| *H01M 2/20* | (2006.01) |
| *H01M 10/50* | (2006.01) |
| *H01M 10/02* | (2006.01) |

(Continued)

(52) U.S. Cl.
CPC ............ *H01M 10/486* (2013.01); *H01M 2/105* (2013.01); *H01M 2/1077* (2013.01); *H01M 2/348* (2013.01); *H01M 10/425* (2013.01); *H01M 10/6554* (2015.04); *H01M 10/482* (2013.01)

(58) Field of Classification Search
CPC ......... H01M 2/00; H01M 2/20; H01M 10/00; H01M 10/02; H01M 10/50; H01M 10/5002; H01M 10/486; H01M 10/502; H01M 10/425; H01M 10/6554; H01M 10/462; H01M 2/105; H01M 2/1077; H01M 2/348

USPC ............................................................ 429/7
See application file for complete search history.

(56) References Cited

U.S. PATENT DOCUMENTS 3,928,907 A * 12/1975 Chisholm .................... 29/527.4
5,585,710 A * 12/1996 Nakamura et al. ............ 320/112
(Continued)

FOREIGN PATENT DOCUMENTS

| JP | 07-85896 A | 3/1995 |
|---|---|---|
| JP | 10-243565 A | 9/1998 |

(Continued)

OTHER PUBLICATIONS

Korean Notice of Allowance issued on Dec. 18, 2012 in the corresponding Korean Patent Application No. 10-2011-0029663.

(Continued)

*Primary Examiner* — Karie O'Neill Apicella
(74) *Attorney, Agent, or Firm* — Robert E. Bushnell, Esq.

(57) ABSTRACT

A core pack and a battery pack using the same. A battery pack includes a plurality of bare cells electrically connected to one another. A protection circuit module (PCM) is positioned at an outside of the bare cells and electrically connected to the bare cells. A temperature measurement device is provided with a temperature sensing portion that senses the temperature of the bare cells, a contact portion connected to the PCM, and a connecting portion through which the temperature sensing portion and the contact portion are connected to each other. A case accommodates the bare cells, the PCM and the temperature measurement device. In the battery pack, the temperature sensing portion is positioned in a space formed between outer circumferential surfaces of bare cells disposed in parallel adjacent to each other. Accordingly, it is possible to improve the quality of the battery.

20 Claims, 3 Drawing Sheets

(51) Int. Cl.
*H01M 10/48* (2006.01)
*H01M 2/10* (2006.01)
*H01M 2/34* (2006.01)
*H01M 10/42* (2006.01)
*H01M 10/6554* (2014.01)

(56) References Cited

U.S. PATENT DOCUMENTS

| | | | | |
|---|---|---|---|---|
| 5,623,191 | A * | 4/1997 | Wieloch | 318/801 |
| 2003/0223474 | A1 * | 12/2003 | Roepke | 374/152 |
| 2005/0112456 | A1 * | 5/2005 | Kozu et al. | 429/62 |
| 2006/0028183 | A1 * | 2/2006 | Izawa et al. | 320/150 |
| 2007/0296541 | A1 | 12/2007 | Garcia et al. | |
| 2012/0028084 | A1 * | 2/2012 | Park et al. | 429/7 |
| 2012/0088135 | A1 | 4/2012 | Kim et al. | |

FOREIGN PATENT DOCUMENTS

| | | |
|---|---|---|
| JP | 2004-095901 A | 3/2004 |
| KR | 1998-053602 U | 10/1998 |
| KR | 1020100037802 A | 4/2010 |
| KR | 10-2010-0081451 A | 7/2010 |
| KR | 1020100081451 A * | 7/2010 |
| KR | 2011-0030352 A | 3/2011 |

OTHER PUBLICATIONS

Korean Office action issued by KIPO on Aug. 17, 2012 in connection with Korean Application No. 10-2011-0029663 and Request for Entry attached herewith.

* cited by examiner

BATTERY PACK

CLAIM OF PRIORITY

This application makes reference to, incorporates the same herein, and claims all benefits accruing under 35 U.S.C. §119 from an application earlier filed in the Korean Intellectual Property Office on Mar. 31, 2011 and there duly assigned Serial No. 10-2011-0029663.

BACKGROUND OF THE INVENTION

1. Field of the Invention

An aspect of the present invention relates to a battery pack, and more particularly, to a battery pack capable of improving the quality thereof.

2. Description of the Related Art

With the rapid development of electronic and communication industries, mobile electronic devices have recently come into wide use. Secondary batteries are widely used as power sources for the mobile electronic devices in consideration of economical efficiency. The secondary batteries may also be used not only in cellular phones or notebook computers but also in medium- and large-sized apparatuses such as machine tools, electric bicycles and automobiles, which require high output and high power.

SUMMARY OF THE INVENTION

Embodiments provide an improved battery pack.

Embodiments also provide a battery pack in which a temperature sensing portion is positioned in a space between bare cells, so that it is possible to prevent interference of the temperature sensing portion with a case that accommodates the bare cells.

Embodiments also provide a battery pack in which a temperature measurement device is formed in a film type, so that it is possible to prevent the temperature measurement device from being twisted.

Embodiments also provide a battery pack in which the length of a temperature measurement device is extended, so that it is possible to prevent the temperature measurement device and a protection circuit module from being separated from each other at a soldering part between the temperature measurement device and the protection circuit module.

According to an aspect of the present invention, there is provided a battery pack including a plurality of bare cells electrically connected to one another, a protection circuit module (PCM) positioned at an outside of the bare cells and electrically connected to the bare cells, a temperature measurement device provided with a temperature sensing portion that senses the temperature of the bare cells, a contact portion electrically connected to the PCM, and a connecting portion through which the temperature sensing portion and the contact portion are electrically connected to each other, and a case that accommodates the bare cells, the PCM and the temperature measurement device. The temperature sensing portion is positioned in a space formed between outer circumferential surfaces of bare cells disposed in parallel adjacent to each other.

A heat conducting means may be fixed in a space formed between the temperature sensing portion and the bare cells.

The heat conducting means may include thermal silicon.

A fixing member may be provided above the temperature sensing portion, and both ends of the fixing member may be respectively fixed to the outer circumferential surfaces of the bare cells disposed adjacent to each other.

The fixing member may include an insulating tape.

The connecting portion may be formed in a shape bent along an outer circumferential surface of one of the bare cells.

The temperature sensing portion may be provided in parallel along the length direction of the bare cells.

The temperature measurement device may be formed in an L shape obtained by bending one region thereof.

The temperature measurement device may further include an insulating member that surrounds the temperature sensing portion and the connecting portion.

The temperature measurement device may be formed of a film type.

The contact portion of the temperature measurement device and the PCM may be connected to each other through soldering.

The temperature measurement device may be provided to be spaced apart from the case.

As described above, according to the present invention, the temperature sensing portion of the temperature measurement device is positioned between bare cells, so that it is possible to prevent the interference between the temperature sensing portion and the case, thereby improving the quality of the battery pack.

Also, the temperature measurement device is formed in a film type, so that it is possible to prevent the temperature measurement device from being twisted, thereby improving manufacturing management and workability of the core pack.

Also, the length of the temperature measurement device is extended, so that it is possible to prevent a soldering part between the temperature measurement device and the PCM from being separated from each other, thereby reducing the defect rate of the core pack.

BRIEF DESCRIPTION OF THE DRAWINGS

A more complete appreciation of the invention, and many of the attendant advantages thereof, will be readily apparent as the same becomes better understood by the reference to the following detailed description when considered in conjunction with the accompanying drawings in which like reference symbols indicate the same or similar components, wherein.

DETAILED DESCRIPTION OF THE INVENTION

Figure 1:
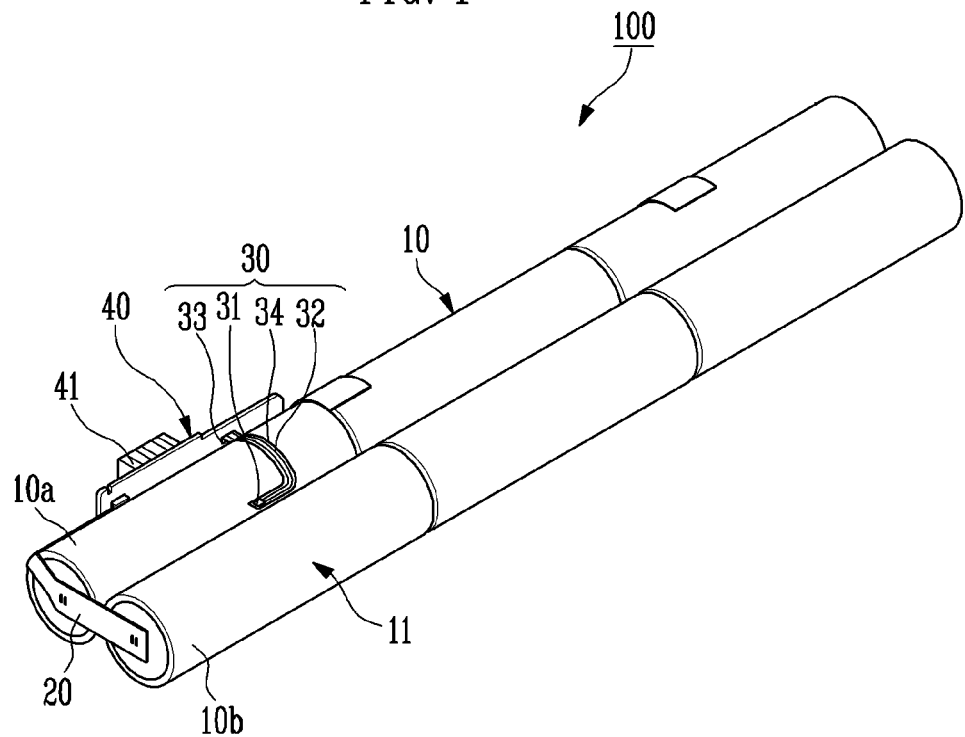
FIG. 1 is an oblique view of a core pack constructed as an embodiment according to the principles of the present invention.

The secondary batteries used in the medium- and large-sized apparatuses are formed as a battery pack used as a power source by connecting a plurality of bare cells in series and/or parallel.

The battery pack having the plurality of bare cells further includes various protection devices for the purpose of safety.

Among these protection devices, a temperature measurement device measures a temperature of the battery pack and then transfers the temperature to a protection circuit module (PCM). If a predetermined temperature is sensed, the temperature measurement device transfers the sensed temperature to the PCM so that current is cut off. Accordingly, the battery pack does not generate heat or catch fire.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

In general, a temperature measurement device for measuring the temperature of a battery pack has one side fixed to a protection circuit module (PCM) through soldering and the other side positioned at a side of bare cells so as to sense the temperature of the battery pack. In this instance, the other side of the temperature measurement device, which senses sense the temperature of the battery pack, may be broken due to its interface with a case that surrounds outer surfaces of bare cells. Since the temperature measurement device is formed in a line shape, its twist may occur. Since the length of the temperature measurement device is short, the one side of the temperature measurement device, soldered to the PCM may be separated from the PCM when an impact is applied to the battery pack.

Therefore, a plan for solving such problems is required in the battery pack. Hereinafter, embodiments of the present invention will be specifically described as the plan for solving the problems with reference to the accompanying drawings.

FIG. 1 is an oblique view of a core pack constructed as an embodiment according to the principles of the present invention.

Referring to FIG. 1, core pack 100 according to the principles of present invention includes a plurality of cylindrical bare cells 10, a PCM 40 and a temperature measurement device 30. In core pack 100, the plurality of bare cells 10 electrically connected to one another are electrically connected to PCM 40. Temperature measurement device 30 measures the temperature of bare cells 10 and transfers the measured temperature to PCM 40.

Bare cell 10 includes an electrode assembly, an electrolyte and a case in which the electrode assembly and the electrolyte are accommodated. Here, the electrode assembly is formed by winding a positive electrode plate, a negative electrode plate and a separator interposed therebetween. Bare cell 10 supplies electric energy generated by a chemical reaction of the electrode assembly and the electrolyte to the exterior thereof. For example, bare cell 10 may be a lithium secondary battery.

PCM 40 may include a printed circuit board (PCB), a protection circuit device, and the like. One or more devices that electrically connect bare cells 10 to an external electronic device are mounted on the PCB. PCM 40 is electrically connected to bare cells 10 by a terminal tab 20, and terminal tab 20 may be formed of nickel, copper or the like.

PCM 40 may further include a connector 41 formed at one side thereof. Connector 41 is a portion fastened to the external electronic device, and the battery pack can be electrically connected to the external electronic device by connector 41.

Generally, temperature measurement device 30 is a semiconductor formed by mixing two or three kinds of oxides and sintering the mixture so as to have a proper specific resistance and a proper temperature coefficient. Here, the two or three oxides include cobalt, copper, manganese, iron, nickel, titanium and the like.

Temperature measurement device 30 may be divided into a negative temperature coefficient (NTC) and a positive temperature coefficient (PTC). The NTC has a characteristic in which resistance decreases as temperature increases, and the PTC has a characteristic in which resistance increases as temperature decreases. Since a rapid change in resistance is generated by even a minute change in temperature due to a small heat capacity of temperature measurement device 30, temperature measurement device 30 is frequently used as a sensor for temperature control.

Temperature measurement device 30 according to the principles of the present invention senses the temperature of the plurality of bare cells 10 and transfers the sensed temperature to PCM 40. Temperature measurement device 30 includes a temperature sensing portion 31 to sense the temperature of bare cells 10, a contact portion 33 electrically connected to PCM 40, and a connecting portion 32 to electrically connect temperature sensing portion 31 to contact portion 33.

Temperature sensing portion 31 may be positioned in a space formed by outer circumferential surfaces 11 of a plurality of bare cells 10a and 10b disposed in parallel adjacent to each other. That is, temperature sensing portion 31 may be positioned near nip 13 where bare cells 10a and 10b meet, at a concave portion 12 formed between the outer circumferential surfaces of the one bare cell 10a and the other bare cell 10b.

In this instance, temperature sensing portion 31 may be provided in parallel along the length direction of bare cell 10. For example, temperature measurement device 30 is formed in an L shape obtained by bending one region thereof, and a portion of temperature measurement device 30 after temperature measurement device 30 is extended and then bent from PCM 40 may be formed as temperature sensing portion 31.

Accordingly, temperature sensing portion 31 of temperature measurement device 30 is positioned near nip 13 between the one bare cell 10a and the other bare cell 10b, so that it is possible to prevent interference with a case 50 (see FIG. 5) that surrounds core pack 100. Thus, it is hardly likely that temperature sensing portion 31 will be damaged by case 50. When this is applied to mass production, the quality of the battery pack can be improved. Here, contact portion 33 of temperature measurement device 30 and PCM 40 may be connected to each other through soldering.

In temperature measurement device 30, temperature sensing portion 31 that measures the temperature of bare cell 10 may be connected to contact portion 33 soldered to PCM 40 by connecting portion 32. Temperature measurement device 30 may be formed in a film type in which a flat-shaped insulating member 34 may be further formed on temperature sensing portion 31 and connecting portion 32. Accordingly, temperature measurement device 30 is adhered closely to bare cell 10, and therefore, its twist is prevented. Thus, it is possible to improve the manufacturing management and workability of core pack 100.

Figure 2:
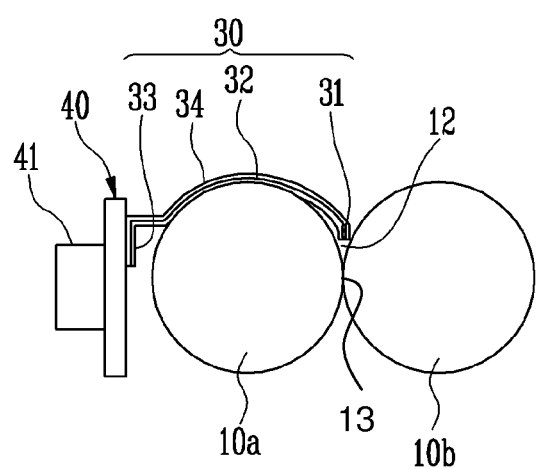
FIG. 2 is a cross-sectional view showing a core pack constructed as an embodiment according to the principles of the present invention.

FIG. 2 is a cross sectional view showing a core pack constructed as an embodiment according to the principles of the present invention.

Referring to FIG. 2, a temperature measurement device 30 constructed as this embodiment includes a contact portion 33 connected to a PCM 40 through soldering, and a temperature sensing portion 31 positioned in a space formed by outer circumferential surfaces of bare cells 10a and 10b disposed in parallel adjacent to each other. Temperature measurement device 30 may further include a connecting portion 32 through which contact portion 33 and temperature sensing portion 31 are connected to each other. In this instance, a film-type insulating member 34 may be further formed on connecting portion 32 and temperature sensing portion 31, which come in contact with the outer circumferential surfaces of bare cells 10a and 10b. Insulating member 34 can prevent a short circuit between temperature measurement device 30 and bare cells 10a and 10b.

Connecting portion 32 is positioned to come in contact with an outer circumferential surface of bare cell 10a, and may be formed in a shape bent along the outer circumferential surface of bare cell 10a. Accordingly, it is possible to prevent temperature measurement device 30 from being lifted off from the outer circumferential surface of bare cell 10a, and temperature measurement device 30 can be adhered closely to bare cell 10a. Also, temperature sensing portion 31 is more stably mounted in a space between bare cells 10a and 10b, so that it is possible to prevent temperature sensing portion 31 from being separated from the space.

Figure 3:
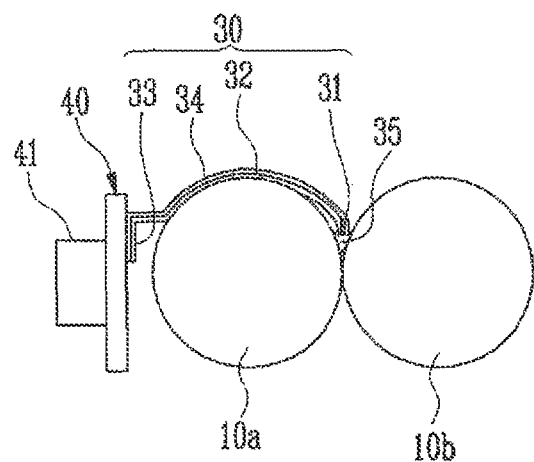
FIG. 3 is a cross-sectional view showing a core pack constructed as another embodiment according to the principles of the present invention.

FIG. 3 is a cross-sectional view showing a core pack constructed as another embodiment according to the principles of the present invention. In FIG. 3, descriptions of components identical to those described with reference to FIGS. 1 and 2 will be omitted.

Referring to FIG. 3, a temperature sensing portion 31 is positioned in a space formed by outer circumferential surfaces of bare cells 10a and 10b. Here, the space is a concave portion. A heat conducting means 35 such as thermal silicon may be formed between temperature sensing portion 31 and the nip 13 of bare cells 10a and 10b. Thus, temperature sensing portion 31 can be firmly fixed in the space by heat conducting means 35.

Figure 4:
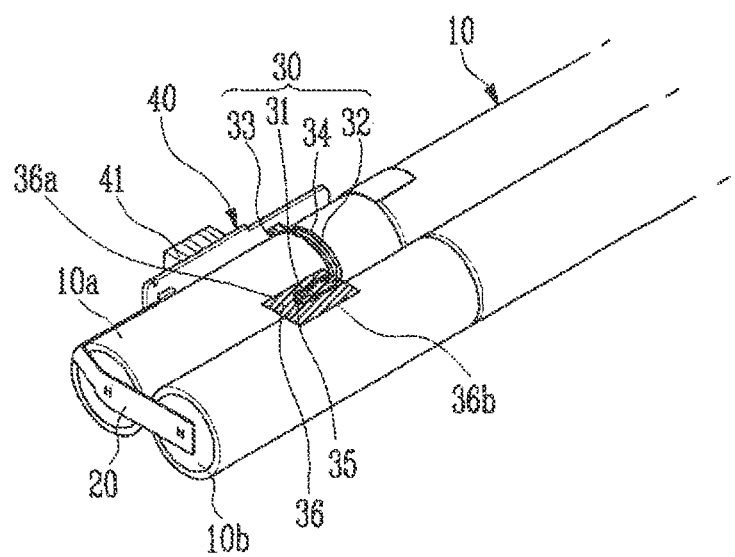
FIG. 4 is an oblique view showing a core pack constructed as still another embodiment according to the principles of the present invention.

FIG. 4 is an oblique view showing a core pack constructed as still another embodiment according to the principles of the present invention.

Referring to FIG. 4, a temperature measurement device 30 may be formed in an L shape obtained by bending one region thereof so that a distal portion thereof extends in parallel along the length direction of a bare cell 10. Here, a portion after temperature measurement device 30 is extended and then bent from a PCM 40 may be formed as a temperature sensing portion 31.

In this instance, a heat conducting means 35 such as thermal silicon is formed between temperature sensing portion 31 and bare cells 10a and 10b, and a fixing member 36 such as an insulating tape may be further formed above temperature sensing portion 31. Both ends 36a and 36b of fixing member 36 may be respectively fixed to outer circumferential surfaces of bare cells 10a and 10b adjacent to each other. Accordingly, temperature sensing portion 31 can be more stably and firmly fixed in the space between bare cells 10a and 10b.

Figure 5:
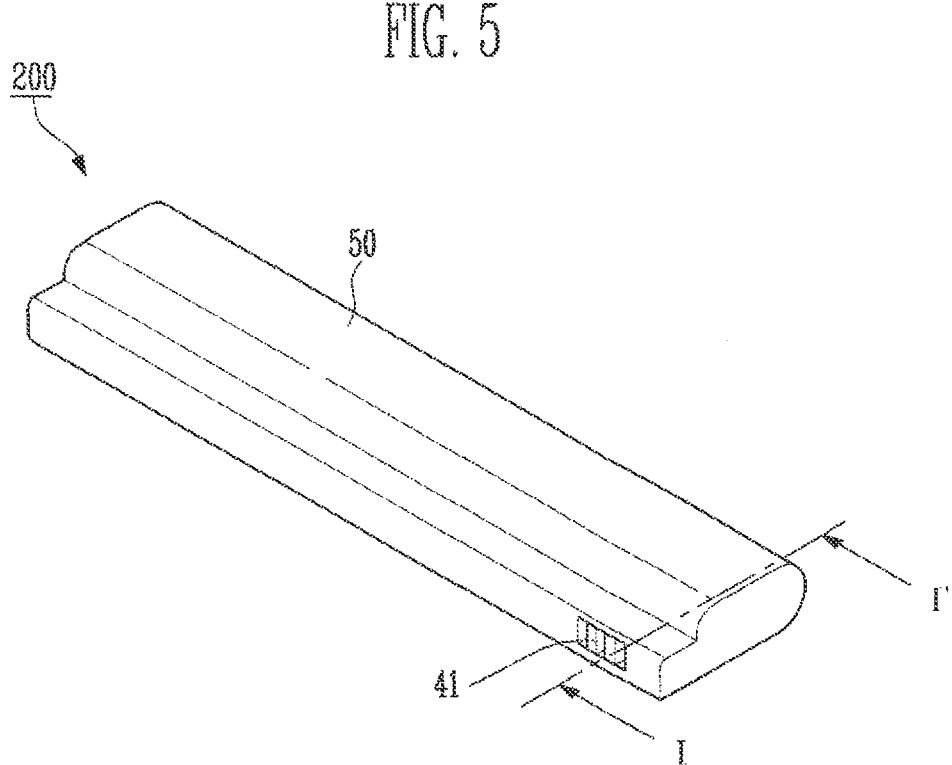
FIG. 5 is an oblique view of a battery pack constructed as an embodiment according to the principles of the present invention.
Figure 6:
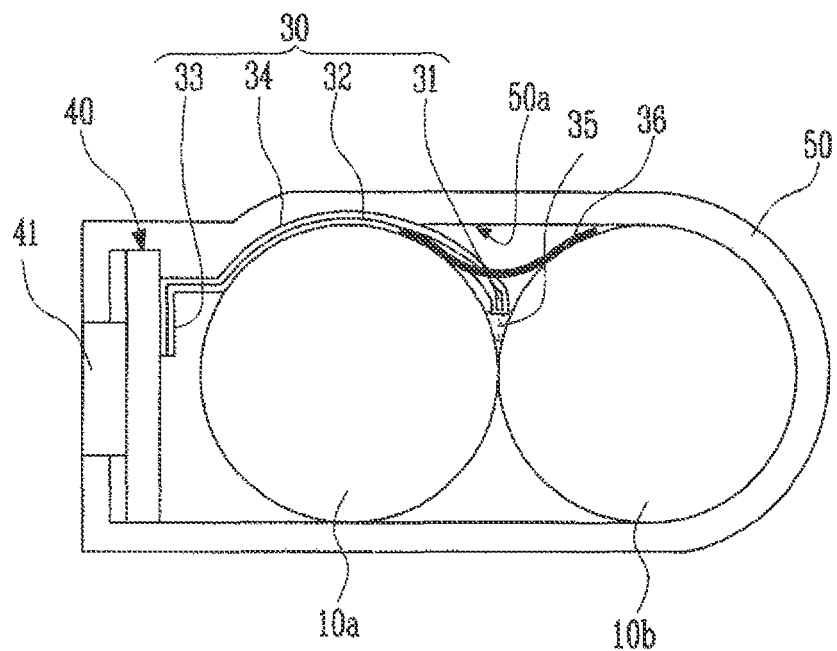
FIG. 6 is a cross-sectional view of the battery pack of FIG. 5 taken along sectional-line I-I' of FIG. 5.

FIG. 5 is an oblique view of a battery pack constructed as an embodiment according to the principles of the present invention. FIG. 6 is a cross-sectional view of the battery pack taken along line I-I' of FIG. 5.

In FIGS. 5 and 6, a battery pack including one of the core packs described in FIGS. 1 to 4 and a case 50 that houses the core pack will be described. However, in FIGS. 5 and 6, the core pack in the interior of case 50 may be configured in various forms such as those in FIGS. 1 to 4. Here, the cross-sectional view of FIG. 6 shows the cross-sectional view of the embodiment of FIG. 4.

Referring to FIGS. 5 and 6, a battery pack 200 according to this embodiment includes a core pack that includes a plurality of bare cells 10 electrically connected to one another, a PCM 40 electrically connected to bare cells 10, and a temperature measurement device 30 that senses the temperature of bare cells 10 and transfers the sensed temperature to PCM 40. Battery pack 200 may further include a case 50 that houses the core pack.

In temperature measurement device 30, a temperature sensing portion 31 that senses the temperature of bare cells 10 is positioned in a concave space between a plurality of bare cells 10a and 10b connected in parallel to each other. Temperature sensing portion 31 may be provided in parallel to the plurality bare cells 10a and 10b. Accordingly, temperature sensing portion 31 can be spaced apart from inner surface 50a of case 50.

In this instance, a first adhesive member 35 and a second adhesive member 36 may be additionally provided so that temperature sensing portion 31 is more firmly and stably fixed in the space between bare cells 10a and 10b.

Temperature measurement device 30 is generally connected to PCM 40, so as to be provided approximately vertically to the length direction of bare cells 10. That is, in temperature measurement device 30, a contact portion 33 is vertically connected to PCM 40. Temperature measurement device 30 connected as described above is positioned vertical to the length direction of bare 10 without bending. A connecting portion 32 of temperature measurement device 30 is positioned to come in contact with one region of the outer circumferential surface of bare cells 10, and temperature sensing portion 31 is positioned near the nip between bare cells 10a and 10b.

In a case where the core pack described above is housed by case 50, case 50 is positioned closely to bare cell 10a, and hence it is not sufficient to secure a space in which temperature sensing portion 31 of temperature measurement device 30 is to be disposed. Therefore, in a case where an impact is applied to battery pack 200, contact portion 33 may become detached from the PCM 40, or there may be caused a defect such as damage to temperature sensing portion 31.

As described above, in the present invention, temperature sensing portion 31 is positioned in the space formed by outer circumferential surfaces of the plurality of cylindrical bare cells 10a and 10b.

To this end, temperature measurement device 30 according to the principles of the present invention may be formed to be further extended toward bare cell 10 from PCM 40 as compared with a general temperature measurement device. Accordingly, it is possible to prevent a soldering part between temperature measurement device 30 and PCM 40 from being separated from each other, and thus it is possible to reduce the defect rate of the battery pack. That is, it is possible to prevent temperature measurement device 30 and PCM 40 from being detached from each other at a location that corresponds to where the soldering part is formed between temperature measurement device 30 and PCM 40. Since temperature sensing portion 31 is stably fixed in the space adjacent to nip 13, the inner surface of case 50 does not interfere with the temperature sensing portion 31, and thus the quality of battery pack 200 can be improved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
    a plurality of bare cells electrically connected to one another and directly contacted with each other;
    a protection circuit module (PCM) positioned at an outside of the bare cells and electrically connected to the bare cells;
    a temperature measurement device including:
        a temperature sensing portion that senses the temperature of the bare cells;
        a contact portion electrically connected to the PCM;
        a connecting portion electrically connecting the temperature sensing portion to the contact portion; and
        an insulating member that surrounds the temperature sensing portion and the connecting portion;
    a case that accommodates the bare cells, the PCM and the temperature measurement device; and
    a fixing member arranged above the temperature sensing portion, wherein both ends of the fixing member are respectively fixed to outer circumferential surfaces of the bare cells, wherein the temperature sensing portion is spaced apart from the case, and is positioned in a space between the outer circumferential surfaces of the bare cells formed by the bare cells directly contacted with each other.

2. The battery pack of claim 1, further comprising a heat conducting means that is fixed in a space formed between the temperature sensing portion and the bare cells.

3. The battery pack of claim 2, wherein the heat conducting means includes thermal silicon.

4. The battery pack of claim 1, wherein the fixing member includes an insulating tape.

5. The battery pack of claim 1, wherein a portion of the connecting portion is formed in a shape adjacent to and bent along an outer circumferential surface of one of the bare cells.

6. The battery pack of claim 1, wherein a portion of the connecting portion is adjacent to and in parallel to the length direction of the bare cells.

7. The battery pack of claim 1, wherein the connecting portion of the temperature measurement device is formed in an L shape obtained by bending one region thereof.

8. The battery pack of claim 1, wherein the temperature measurement device is formed of a film type, wherein the connecting portion includes a conducting wire, the conducting wire being arranged on the insulating member, the insulating member being a film type insulating member.

9. The battery pack of claim 1, wherein the contact portion of the temperature measurement device and the PCM are connected to each other through soldering.

10. The battery pack of claim 1, wherein the connecting portion of the temperature measurement device has an elongated shape, and a portion of the connecting portion is bent along the outer circumferential surface of at least one of the bare cells.

11. The battery pack of claim 1, the connecting portion having an L-shape that includes a bent portion separating a first portion from a second portion, the first portion being electrically connected to the PCM and extending transversely across one of the bare cells along an outer cylindrical surface of the one of the bare cells, the second portion including the temperature sensing portion at a distal end thereof, the second portion extending in parallel to a longitudinal direction of the one of the bare cells.

12. The battery pack of claim 1, wherein each of the bare cells are cylindrical bare cells having curved side surfaces, wherein the plurality of bare cells include a first bare cell and a second bare cell, each having a longitudinal direction that is parallel to each other and having the curved side surfaces thereof directly contacting one-another along a length of each of the first and second bare cells, the temperature sensing portion being arranged in a vicinity of where the first and second bare cells directly contact one another.

13. The battery pack of claim 1, at least two of the bare cells are cylindrical, are arranged adjacent to each other, extend in parallel to each other and form a nip at a location where outer cylindrical surfaces of the two bare cells directly contact each other, the temperature sensing portion being arranged in a vicinity of the nip, and a distal portion of the connecting portion extends in a direction parallel to said nip.

14. The battery pack of claim 1, wherein a distal portion of the temperature measurement device that includes the temperature sensing portion extends in parallel to a longitudinal direction of the bare cells.

15. The battery pack of claim 1, wherein the connecting portion is comprised of a conductive wire, wherein only the connecting portion and the temperature sensing portion are arranged within the insulating member.

16. A battery pack, comprising:
    at least two cylindrical bare cells electrically connected to one another and directly contacted with each other, extending in parallel to each other and forming a nip at a location where outer cylindrical surfaces of the two cylindrical bare cells touch each other;
    a protection circuit module (PCM) arranged at an outside of the bare cells and electrically connected to the bare cells;
    a film-type temperature measurement device including a temperature sensing portion that senses a temperature of the bare cells, a contact portion electrically connected to the PCM, and a connecting portion electrically connecting the temperature sensing portion to the contact portion; and
    a case that accommodates the bare cells, the PCM and the film-type temperature measurement device, wherein the temperature sensing portion is spaced apart from the case, and is positioned in the nip between the outer circumferential surfaces of the two cylindrical bare cells formed by the two cylindrical bare cells directly contacted with each other.

17. The battery pack of claim 16, wherein a portion of the temperature measurement device corresponding to the temperature sensing portion is spaced apart from the case in a thickness direction of the battery pack by a gap, the gap being an empty space.

18. The battery pack of claim 16, the film-type temperature measurement device further comprises:
    a thermal silicon heat conductor arranged between the nip between the batteries and the temperature sensing portion; and
    an insulating tape arranged on an opposite side of the film-type temperature sensing portion than the thermal silicon heat conductor, the insulating tape being attached to both of the cylindrical bare cells.

19. The battery pack of claim 16, the connecting portion having an L-shape that includes a bent portion separating a first portion from a second portion, the first portion being electrically connected to the PCM and extending transversely across one of the bare cells along an outer cylindrical surface of the one of the bare cells, the second portion including the film-type temperature sensing portion at a distal end thereof, the second portion extending in parallel to the two cylindrical cells and to the nip.

20. The battery pack of claim 16, wherein the two cylindrical cells directly contact each other along the nip, wherein a first portion of the film-type temperature measurement device is arranged directly on and extends along an outer cylindrical surface of one of the two cylindrical bare cells, and a second portion of the film-type temperature measurement device is arranged in a vicinity of and extends parallel to the nip.

* * * * *